(12) United States Patent
Hannuksela

(10) Patent No.: US 7,436,886 B2
(45) Date of Patent: Oct. 14, 2008

(54) CODING SCENE TRANSITIONS IN VIDEO CODING

(75) Inventor: Miska Hannuksela, Tampere (FI)

(73) Assignee: Nokia Corporation, Espoo (FI)

( * ) Notice: Subject to any disclaimer, the term of this patent is extended or adjusted under 35 U.S.C. 154(b) by 810 days.

(21) Appl. No.: 10/348,686

(22) Filed: Jan. 22, 2003

(65) Prior Publication Data

US 2003/0142751 A1 Jul. 31, 2003

(30) Foreign Application Priority Data

Jan. 23, 2002 (FI) .................................. 20020128

(51) Int. Cl.
*H04N 7/12* (2006.01)

(52) U.S. Cl. .............. 375/240.01; 375/240; 375/240.12

(58) Field of Classification Search ................ 375/240, 375/240.01, 240.12; 382/238; 715/500.1; 386/52

See application file for complete search history.

(56) References Cited

U.S. PATENT DOCUMENTS

| | | | |
|---|---|---|---|
| 5,703,995 A | 12/1997 | Willbanks | |
| 5,966,162 A | 10/1999 | Goode et al. | |
| 6,201,924 B1 * | 3/2001 | Crane et al. | 386/52 |
| 6,301,428 B1 | 10/2001 | Linzer | |
| 6,337,881 B1 | 1/2002 | Chaddha | |
| 6,360,234 B2 * | 3/2002 | Jain et al. | 715/500.1 |
| 6,614,936 B1 * | 9/2003 | Wu et al. | 382/238 |
| 6,912,251 B1 * | 6/2005 | Ward et al. | 375/240 |
| 2002/0167608 A1 | 11/2002 | Szybiak et al. | |

FOREIGN PATENT DOCUMENTS

| | | |
|---|---|---|
| EP | 1 123 812 | 9/2001 |
| WO | WO 97/30544 | 8/1997 |
| WO | WO 01/47283 | 6/2001 |

OTHER PUBLICATIONS

Sep. 2002, Hannuksela, M et al.; Sub-Picture: ROI Coding and Unequal Error Protection, IEEE 2002 Conference, Sep. 2002, USA (internet publication).

Sep. 2002, Hannuksela, M et al.; Sub-Picture: Video-Coding and Unequal Error Protection, XI European Signal Processing Conference, Sep. 2002, Toulouse, France (internet publication).

(Continued)

*Primary Examiner*—Allen Wong
(74) *Attorney, Agent, or Firm*—Hollingsworth & Funk, LLC

(57) ABSTRACT

A method of generating a scene transition in a video sequence between a first and a second scene. One of the scenes comprises independently decodable video frames coded according to a first frame format, and video frames coded according to a second frame format, one of the video frames according to the second frame format being predicted from one other video frame. The presentation time of one video frame of the first scene is determined to be equal to that of one scene transition video frame of the second scene during the scene transition. Scene transition information is determined for one video frame of one scene for generating a scene transition with a decoder. One scene transition video frame of the first scene, one scene transition video frame of the second scene, and the scene transition information are coded in the encoder into the video sequence.

10 Claims, 2 Drawing Sheets

OTHER PUBLICATIONS

Jul. 12, 2001, Wang, Y.K. et al.: Core Experiment Description of Sub-Picture Coding, ITU 15. Meeting 3., Pattaya, Thailand (internet publication).

Jan. 2, 2002, Wang, Y.K. et al.: Results of the Core Experiment for Sub-Picture Coding, JVT 2. Meeting 29.1., Geneva, Switzerland (internet publication).

W3C [online], "The SMIL 2.0 Transition Effects Module", Aug. 7, 2001 [retrieved on Jan. 22, 2003]. Retrieved from the Internet: URL: http://www.w3.org/TR/smil20/smil-transitions.html.

Jan. 15, 1998, ITU-Telecommunications Standardization Union, *Draft Text of Recommendation H.263 Version 2 ("H.263+") for Decision*.

Jul. 10, 2002, ITU-Telecommunications Standardization Union, *H.26L Test Model Long Term No. 8 (TML-8) Draft0*, Document VCEG-N10. pp. 1-46.

\* cited by examiner 200  202  204  206

300  302  304  306

CODING SCENE TRANSITIONS IN VIDEO CODING

FIELD OF THE INVENTION

The invention relates to video coding, particularly to transitions between scenes that are included in video files, i.e. to scene transitions.

BACKGROUND OF THE INVENTION

Video files are composed of a plurality of still image frames, which are shown rapidly in succession as a video sequence (typically 15 to 30 frames per second) to create an idea of a moving image. Image frames typically comprise a plurality of stationary background objects defined by image information that remains substantially the same, and few moving objects defined by image information that changes somewhat. In such a case, the image information comprised by the image frames to be shown in succession is typically very similar, i.e. consecutive image frames comprise much redundancy. In fact, the redundancy comprised by video files is dividable into spatial, temporal and spectral redundancy. Spatial redundancy represents the mutual correlation between adjacent image pixels; temporal redundancy represents the change in given image objects in following frames, and spectral redundancy the correlation between different colour components within one image frame.

Several video coding methods utilize the above-described temporal redundancy of consecutive image frames. In this case, so-called motion-compensated temporal prediction is used, wherein the contents of some (typically most) image frames in a video sequence are predicted from the other frames in the sequence by tracking the changes in given objects or areas in the image frames between consecutive image frames. A video sequence comprises compressed image frames, whose image information is determined without using motion-compensated temporal prediction. Such frames are called INTRA or I frames. Similarly, motion-compensated image frames comprised by a video sequence and predicted from previous image frames are called INTER or P frames (Predicted). One I frame and possibly one or more previously coded P frames are used in the determination of the image information of P frames. If a frame is lost, frames depending thereon can no longer be correctly decoded.

Typically, an I frame initiates a video sequence defined as a Group of Pictures (GOP), the image information of the P frames comprised by which can be defined using only the I frames comprised by said group of pictures GOP and previous P frames. The following I frame again initiates a new group of images GOP, and the image information of the frames comprised by it cannot thus be defined on the basis of the frames in a previous group of pictures GOP. Accordingly, groups of pictures GOP do not temporally overlap and each group of pictures can be independently decoded. In addition, many video compression methods use bi-directionally predicted B frames, which are placed between two anchor frames (I and P frame or two P frames) within a group of pictures GOP, and the image information of the B frame is predicted from both the previous anchor frame and the anchor frame following the B frame. B frames thus provide image information of a better quality than do P frames, but they are typically not used as an anchor frame and discarding them from the video sequence does therefore not cause any deterioration of the quality of subsequent pictures.

Each image frame is dividable into macro blocks that comprise the colour components (e.g. Y, U, V) of all pixels from a rectangular image area. More precisely, a macro block is composed of three blocks, each block comprising colour values (e.g. Y, U or V) from one colour layer of the pixels from said image area. The spatial resolution of the blocks may be different from that of the macro block; for example, components U and V can be presented at only half the resolution compared with component Y. Macro blocks can also be used to form for example slices, which are groups of several macro blocks wherein the macro blocs are typically selected in the image scanning order. In fact, in video coding methods, temporal prediction is typically performed block or macro block-specifically, not image frame-specifically.

Many video materials, such as news, music videos and movie trailers comprise rapid cuts between different image material scenes. Sometimes cuts between different scenes are abrupt, but often scene transition is used, i.e. the transition from scene to scene takes place for instance by fading, wiping, tiling or rolling the image frames of a previous scene, and by bringing forth the scenes of a subsequent scene. As regards coding efficiency, the video coding of a scene transition is often a serious problem, since the image frames during a scene transition comprise information on the image frames of both the ending scene and the beginning scene.

A typical scene transition, fading, is performed by lowering the intensity or luminance of the image frames in a first scene gradually to zero and simultaneously raising the intensity of the image frames in a second scene gradually to its maximum value. Such a scene transition is called a cross-faded scene transition. A second typical scene transition, tiling, is performed by randomly or pseudo-randomly discarding square parts from the image frames of a first scene, and replacing the discarded parts with bits taken from the corresponding places in a second scene. Some typical scene transitions, such as roll, push, door etc., are accomplished by 'fixing' the first image frames on the surface of a virtual object (a paper sheet, a sliding door or an ordinary door) or some other arbitrary object, and turning this object or piece gradually away from sight, whereby information about the image frames of a second scene is copied to the emerging image areas. Many other transitions are known and used in several commercially available products, such as Avid Cinema™ (Avid Technology Inc.).

Present video coding methods utilize several methods of coding scene transitions. For example, in the coding according to the ITU-T (International Telecommunication Union, Telecommunication Standardization Sector) H.263 standard, the above-described B frames are usable for presenting image frames during a scene transition. In this case, one image frame from a first (ending) scene and one image frame from a second (beginning) scene are selected as anchor frames. The image information of the B frames inserted between these during the scene transition is defined from these anchor frames by temporal prediction such that the pixel values of the predicted image blocks are calculated as average values of the pixel values of the motion-compensated prediction blocks of the anchor frames.

As regards coding efficiency, such a solution is, however, disadvantageous particularly if coding the scene transition requires that several B frames be inserted between the anchor frames. In fact, the coding has been improved in the ITU-T H.26L standard such that the image information of the B frames inserted between the anchor frames during the scene transition is defined from these anchor frames by temporal prediction such that the pixel values of the B image frames are calculated as weighted average values of the pixel values of the anchor frames based on the temporal distance of each B frame from both anchor frames. This improves the coding efficiency of scene transitions made by fading, in particular, and also the quality of the predicted B frames.

Generally speaking, it is feasible that a computer-generated image is made of layers, i.e. image objects. Each of these image objects is definable by three types of information: the texture of the image object, its shape and transparency, and the layering order (depth) relative to the background of the image and other image objects. For example, MPEG-4 video coding uses some of these information types and the parameters values defined for them in coding scene transitions.

Shape and transparency are often defined using an alpha plane, which measures non-transparency, i.e. opacity and whose value is usually defined separately for each image object, possibly excluding the background, which is usually defined as opaque. It can be defined that the alpha plane value of an opaque image object, such as the background, is 1.0, whereas the alpha plane value of a fully transparent image object is 0.0. Intermediate values define how strongly a given image object is visible in the image relative to the background and other at least partly superposed image objects that have a higher depth value relative to said image object.

Layering image objects on top of each other according to their shape, transparency and depth position is called scene composition. In practice, this is based on the use of weighted average values. The image object closest to the background, i.e. positioned the deepest, is first positioned on top of the background, and a combined image is created from these. The pixel values of the composite image are determined as an average value weighted by the alpha plane values of the background image and said image object. The alpha plane value of the combined image is then defined as 1.0, and it then becomes the background image for the following image object. The process continues until all image objects are combined with the image.

The above-described process for coding a scene transition is used for instance in MPEG-4 video coding such that image frames in a beginning scene are typically selected as background images, whose opacity has a full value, and the opacity of image frames in an ending scene, the frames being 'image objects' to be positioned on top of the background, is reduced during the scene transition. When the opacity, i.e. alpha plane value, of the image frames of the ending scene reaches zero, only the image frame of the beginning scene is visible in the final image frame.

However, prior art scene transition coding involves several problems. The use of weighted anchor frame average values in the prediction of B frames does not work well in situations wherein the duration of the scene transition is long and the images include much motion, which considerably lowers the compression efficiency of coding based on temporal prediction. If the B pictures used in the scene transition are used for traffic shaping for instance in a streaming server, the image rate of the transmitted sequence temporarily decreases during the scene transition, which is usually observed as image jerks.

A problem in the method used in MPEG-4 video coding is the complexity of coding a scene transition. In MPEG-4 video coding, scene composition always takes place by means of a system controlling the video coding and decoding, since an individual MPEG-4 video sequence cannot contain the information required for composing a scene from two or more video sequences. Consequently, composing a scene transition requires control-level support for the actual process and simultaneous transfer of two or more video sequences, which typically requires a wider bandwidth, at least temporarily.

BRIEF DESCRIPTION OF THE INVENTION

The object of the invention is thus to provide a method and an apparatus for implementing the method to alleviate the above problems. The objects of the invention are achieved by a method, video encoder, video decoder and computer software that are characterized in what is disclosed in the independent claims.

The preferred embodiments of the invention are disclosed in the dependent claims.

The invention is based on composing a scene transition in a video sequence between at least a first and a second scene, the first scene being an ending scene and the second scene a beginning scene. At least one of the scenes comprises independently decodable video frames coded according to at least a first frame format, i.e. I frames, and video frames coded according to a second frame format, i.e. P or B frames, at least one of the video frames according to the second frame format being predicted from at least one other video frame. The scene transition is coded in the video sequence preferably such that the presentation times of at least one video frame of the first scene and at least one video frame of the second scene are determined to be the same during the scene transition, allowing said video frames to be called scene transition video frames. Scene transition information for composing a scene transition with a decoder is defined for at least one video frame of at least one of the scenes. At least said one scene transition video frame of the first scene, said one scene transition video frame of the second scene and said scene transition information are then coded in a encoder into the video sequence.

Similarly, when said video sequence is being decoded, the coded video frame of the first scene, the coded video frame of the second scene, and the coded scene transition information are received at a decoder. These are decoded and the scene transition is generated using the decoded video frame of the first scene, the decoded video frame of the second scene, and the decoded scene transition information.

In a preferred embodiment of the invention, frames of the first and second scenes are placed on different scalability layers comprising at least a base layer and a first enhancement layer.

The advantage of the method of the invention is that it allows a scene transition to be coded in a video sequence such that it comprises essential information about the different scenes and their processing during the scene transition, enabling the decoding of the scene transition in a decoder based merely on the information comprised by said video sequence. A further advantage is that the method of the invention enables scalable coding also in the coding of the scene transition. An additional advantage is that, in accordance with a preferred embodiment of the invention, the scalability layers of the video sequence are combined with the above-described image objects of image frames and their information types such that a scalable video coding is achieved for the scene transition, the compression efficiency of the coding simultaneously being good.

BRIEF DESCRIPTION OF THE FIGURES

In the following, the invention will be described in detail in connection with preferred embodiments with reference to the accompanying drawings, in which.

DETAILED DESCRIPTION OF THE INVENTION

Figure 1:
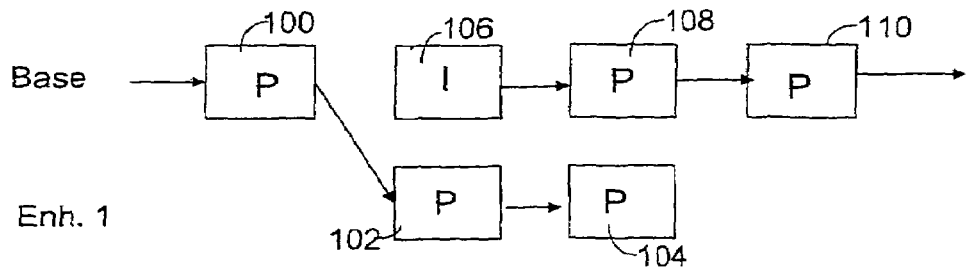
FIG. 1 shows the placement of the image frames of two different scenes onto scalability layers in accordance with a preferred embodiment of the invention.

The invention is applicable to all video coding methods using scalable coding. The invention is particularly applicable to different low bit rate video codings typically used in limited-band telecommunication systems. These include for instance ITU-T standard H.263 and H.26L (later possibly H.264), which is currently being standardized. In these systems, the invention is applicable for instance in mobile stations, allowing video playback to adapt to variable transfer capacity or channel quality and the processor power available at each particular time when other applications than video playback is run in the mobile station.

Furthermore, it is to be noted that, for the sake of clarity, the invention will be described next by describing the coding and temporal prediction of image frames at image frame level. However, in practice, coding and temporal prediction typically take place at block or macro block level, as was stated above.

Several video coding methods use scalable coding for flexible adjustment of the video coding bit rate, whereby some elements or element sets in a video sequence can be discarded without it having any impact on the reconstruction on the other parts of the video sequence. Scalability is typically implemented by grouping image frames onto several hierarchical layers. Substantially only the image frames necessary for decoding the video information at the receiving end are coded in the image frames of the base layer.

The concept of an independently decodable group of pictures GOP is typically used also in this case. In some video coding methods, such an independently decodable group of pictures may constitute a subsequence, although in the present description, a sub-sequence is understood to mean any group of pictures whose pictures can be decoded using the pictures of the same group of pictures and one or more other groups of pictures. The base layer in each group of pictures GOP typically comprises at least one I frame and a necessary number of P frames. One or more enhancement layers may be defined under the base layer, each layer improving the quality of the video coding compared with the upper layer. Consequently, enhancement layers comprise P or B frames predicted by motion compensation from the pictures of one or more upper layers. On each layer, the frames are typically numbered in accordance with a predetermined alphanumeric series.

As regards the terminal that plays back the video sequence, the quality of the picture to be displayed improves the more scalability layers are available or the more scalability layers it is capable of decoding. In other words, the temporal or spatial resolution or spatial quality of image data improves, since the amount of image information and the bit rate used for its transfer increase. Similarly, a larger number of scalability layers also sets considerably higher requirements on the processing power of the terminal as regards decoding.

Correspondingly, the bit rate of a video sequence is adjustable by discarding lower scalability layers from the video sequence. The dependence of each image frame in a group of pictures or a sub-sequence on the other image frames in the group of pictures may also be known in some cases. In these instances, the group of pictures or the sub-sequence and the pictures dependent thereon also constitute an independent entity that can be omitted from the video sequence, if need be, without it affecting the decoding of subsequent image frames in the video sequence. Accordingly, the image frames of only said sub-sequence and the sub-sequences of lower scalability layers dependent thereon remain un-decoded or at least cannot be decoded correctly. In other words, scalable video coding brings forth a plurality of advantages for adjusting the bit rate of a video sequence.

Next, a method of implementing a scene transition utilizing scalable video coding will be described. In accordance with the invention, a method will be described, wherein the scalability layers of a video sequence are combined with the above described image frame image objects and their information types such that scalable video coding having good compression efficiency is achieved for the scene transition.

However, it is to be noted that the invention is not only restricted to scalable coding of a scene transition. It is essential to the invention to enable the coding of a scene transition into a video sequence such that it comprises essential information about the different scenes and their processing during the scene transition, whereby the scene transition can be decoded in a decoder merely based on the information comprised by said video sequence.

The following is an exemplary illustration of the invention using a cross-faded scene transition and an abrupt scene transition as examples. The image frames to be presented during a scene transition are typically composed of two superposed image frames, the first image frame from a first scene and the second image frame from a second scene. One of the image frames constitutes a background picture and the other, called a foreground picture, is placed on top of the background picture. The opacity of the background picture is constant, i.e. its pixel-specific alpha level values are not adjusted.

In the present embodiment of the invention, the background picture and the foreground picture are determined by scalability layers. This is illustrated in FIG. 1 showing an example of how the image frames of two different scenes are placed on scalability layers during a scene transition according to the invention. In FIG. 1, the first image frame 100 of a first (ending) scene is located on a base layer. The image frame 100 may be either an I frame, the determination of whose image information does not use motion-compensated temporal prediction or a P frame, which is a motion-compensated image frame predicted from previous image frames. The coding of a second (beginning) scene begins during a temporally subsequent image frame, and, in accordance with the invention, the image frames comprised by it are also placed on the base layer. This means that the rest of the image frames 102, 104, of the second (ending) scene are placed on a first enhancement layer (Enhancement1). These image frames are typically P frames.

As stated, in this embodiment, the image frames comprised by the second (beginning) scene are placed on the base layer, at least for the duration of the scene transition. The first image frame 106 of the scene is typically an I frame, from which the subsequent image frames of the second scene are temporally predicted. In other words, the subsequent image frames of the second scene are temporally predicted frames, typically P frames, as shown in FIG. 1 by frames 108 and 110.

Such image frame placement on scalability layers enables a cross-faded scene transition to be implemented in accordance with a preferred embodiment of the invention such that the image frame on the base layer is always defined as a background picture whose opacity is at its maximum (100%). During a scene transition, image frames located on an enhancement layer are placed on top of the background picture and their opacity is adjusted or instance with suitable filters such that the frames gradually change from opaque to transparent.

In the video sequence of FIG. 1, there are no image frames on lower scalability layers during the first image frame 100 of the base layer. For this point in time, only the first image frame 100 of the base layer is coded in the video sequence.

A new (second) scene begins at the following image frame 106 on the base layer, image frame 106 being set as the background picture as regards its depth position, and its opacity value being defined to maximum. Temporally simultaneously with image frame 106 on the base layer is image frame 102 of the ending (first) scene on the enhancement layer, and its transparency should be increased in order to achieve a cross-faded scene transition. The example of FIG. 1 assumes that opacity is set to a value of for instance 67%, in addition to which image frame 102 is defined as a foreground picture as regards its depth position. For this point in time, a picture combined from image frames 106 and 102 is coded in the video sequence, and it shows picture 106 more faintly in the background and picture 102 more clearly in the foreground, since its opacity value is substantially high (60 to 100%).

During the temporally following image frame, a second image frame 108 of the second scene is on the base layer and it is similarly set as the background picture as regards its depth position, and its opacity value is defined to maximum. In addition, the last image frame 104 of the temporally simultaneously ending (first) scene is on the first enhancement layer, the opacity value of the frame being for instance 33%, and, in addition, image frame 104 is defined as a foreground picture as regards its depth position. That is, for said point in time, a picture combined from image frames 108 and 104 is coded into the video sequence, and it shows picture 108 more clearly in the background and picture 104 more faintly in the foreground, since its opacity value is substantially low (10 to 40%). Furthermore, it is feasible that between said image frame there would be a frame whose opacity value is substantially 50%, but this is not shown in this example.

During the temporally following image frame, a third image frame 110 of the second scene is on the base layer. Since the first scene has ended, only image frame 110 is coded into the video sequence and the presentation of the second scene continues from that frame.

Figure 2:
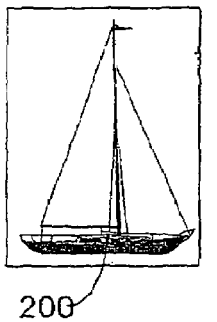
FIG. 2 shows a scene transition that can be composed by means of the placement of image frames according to FIG. 1.
Figure 2:
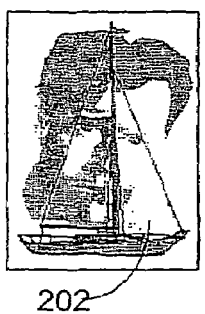
Figure 2:
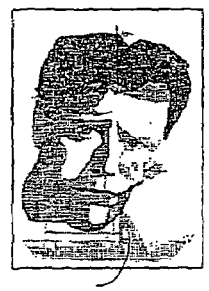
Figure 2:

The video sequence of FIG. 2 can be preferably used to illustrate the above described cross-faded scene transition. In FIG. 2, image frame 200 shows a picture of a boat, the image frame belonging to the first (ending) scene in this video sequence. Image frame 200 corresponds to image frame 100 of the first base layer in the video sequence of FIG. 1, during which frame there are no image frames on lower scalability layers. In other words, only the first image frame 100 of the base layer is coded into the video sequence for said point in time.

At the next point in time, a scene transition starts in the video sequence of FIG. 2, image frame 202 comprising image information about the first (ending) scene and the second (beginning) scene, combined in accordance with the invention. The beginning scene shows a picture of a man's head dimly in the background of image frame 202. Image frame 202 corresponds to the point in time in FIG. 1, when image frame 106 of a beginning scene is on the base layer and image frame 102 of an ending scene on the enhancement layer. Image frame 106 (head) is set as a background picture as regards its depth position and its opacity value is defined to maximum. The opacity of image frame 102 (boat) on the first enhancement layer is set to the value 67% and image frame 102 is defined as a foreground picture as regards its depth position. For this point in time, an image frame 202, combined from image frames 106 and 102 is coded in the video sequence, wherein picture 106 (head) is shown more faintly in the background and picture 102 (boat) more intensely at the front, since its opacity value is substantially high (67%).

At the next point in time, the scene transition still continues in the video sequence of FIG. 2, image frame 204 also comprising image information about the first (ending) scene and the second (beginning) scene, combined in accordance with the invention. Image frame 204 corresponds to the point in time in FIG. 1, when image frame 108 of a beginning scene is on the base layer and the last image frame 104 of an ending scene is on the enhancement layer. In the same way, image frame 108 is set as the background picture as regards its depth position, its opacity value being defined to maximum. The opacity value of image frame 104 is set to 33%, and, in addition, image frame 104 is defined as a foreground picture as regards its depth position. That is, picture 204, combined from image frames 108 and 104, is coded in the video sequence for said point in time, wherein picture 108 (head) is seen more intensely in the background and picture 104 (boat) more faintly at the front, since its opacity value is only 33%.

At the last point in time in the video sequence of FIG. 2, the scene transition is ended and only the third image frame 110 of the second scene on the base layer is coded in image frame 206, from which the presentation of the second scene continues.

The above described by way of example how the placement of image frames according to the invention onto different scalability layers allows a cross-faded scene transition to be implemented advantageously as regards coding efficiency. However, in the transmission or decoding of a video sequence, a situation may arise when the bit rate of the video sequence is to be adapted to the maximum value of the bandwidth and/or terminal decoding rate available for data transfer. Such an adjustment of the bit rate causes problems to known video coding methods in implementing a scene transition.

In accordance with a preferred embodiment of the invention, one or more scalability layers or independently decodable groups of pictures GOP or sub-sequences comprised thereby can now be discarded from a video sequence thus lowering the bit rate of the video sequence, and yet the scene transition can be simultaneously decoded without lowering image frequency. In the placement of image frames according to FIG. 1, this can be implemented by discarding the first enhancement layer from the video sequence. This means that only image frames 100, 106, 108 and 110 comprised by the base layer are shown of the video sequence. In other words, a transition occurs directly from the first (ending) scene to the second (beginning) scene as an abrupt scene transition, i.e. directly from image frame 100 of the first scene to the beginning I image frame 106 of the second scene. In other words, an abrupt scene transition is performed instead of a cross-faded scene transition. However, a scene transition can be preferably performed without it having an impact on the picture quality in the video sequence, and, typically, the viewer does not experience an abrupt scene transition performed instead of a cross-faded scene transition as disturbing or faulty. In a prior art implementation, wherein scalability layers cannot be discarded, image frequency would instead have to be lowered at a scene transition, and the viewer would experience this as jerking and disturbing.

Figure 3:
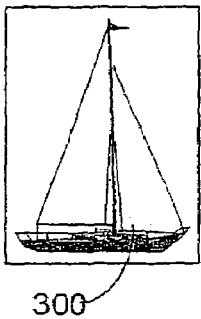
FIG. 3 shows a second scene transition that can be composed by means of the placement of image frames according to FIG. 1.
Figure 3:
Figure 3:
Figure 3:

The above described abrupt scene transition can be preferably illustrated by the video sequence of FIG. 3, comprising the same scenes (boat and head) as the video sequence shown in FIG. 2. Also in FIG. 3, image frame 300 shows a picture of a boat, whose image frame belongs to the first (ending) scene in the video sequence. That is, image frame 300 corresponds to image frame 100 of the first base layer in the video sequence of FIG. 1, during the duration of which no image frames exist on the lower scalability layers. In other words, only the first image frame 100 of the base layer is coded into the video sequence for said point in time.

At the next point in time, an abrupt scene transition from the first scene to the second scene is performed in the video sequence of FIG. 3 by discarding the image frames on the enhancement layer from the video sequence. In accordance with the invention, image frame 302 then comprises image information only about a second (beginning) scene on the base layer, the man's head being clearly visible in image frame 302. In other words, image frame 302 corresponds to image frame 106 of FIG. 1 as such.

Similarly, image frame 304 comprises image information only about the second image frame 108 of the second scene on the base layer. In the video sequence of FIG. 3, only the third image frame 110 of the second scene on the base layer is coded into image frame 306, and the display of the second scene continues from there.

As FIG. 3 shows, the scene transition can preferably be performed as an abrupt scene transition without it affecting the picture quality in the video sequence, nor can the abrupt scene transition shown in image frames 300 to 306 be observed in any way faulty.

As is evident from the above, as regards the implementation of the invention, it is preferable to always place the image frames of a latter scene typically on the base layer and set them as background pictures in a depth position. However, if the intention is to emphasize the first (ending) scene for instance because, in the case of an abrupt scene transition, the intention is to show all image frames of the ending scene, then the image frames of the first scene can be placed on the base layer. In this case, in accordance with an embodiment of the invention, an I frame has to be coded in the second (beginning) scene instead of a P frame immediately after the scene transition. However, as regards compression efficiency, this is not as preferable a solution as the above described coding arrangement.

In accordance with a preferred embodiment of the invention, the above problem can be solved in systems supporting backward temporal prediction. A method called 'reference picture selection' is known in some coding methods, which in its general form allows also the prediction of the image information of image frames from temporally later image frames. The transfer of an INTRA frame is a coding technique that utilizes the reference picture selection. This means that the INTRA frame is not placed in a temporally 'correct' place in a video sequence, but its place is transferred temporally later. In this case, the image frames between the 'correct' place and the real place of the INTRA frame in the video sequence are predicted from said INTRA frame temporally backwards. This naturally requires that non-coded image frames be buffered for a sufficiently long time in order for all image frames shown to be coded and arranged in the display order.

Figure 4:
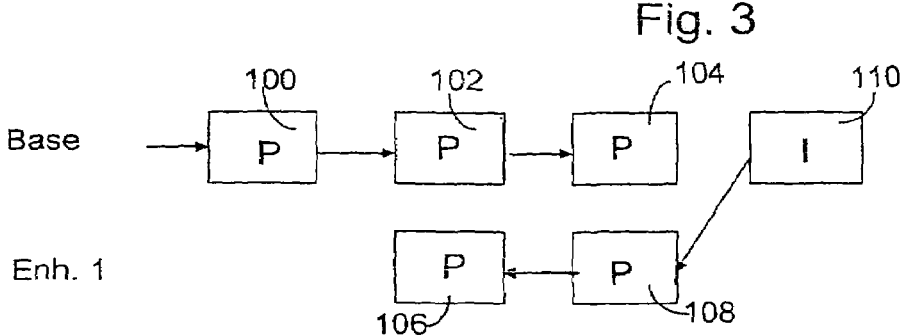
FIG. 4 shows the placement of the image frames of two different scenes onto scalability layers in accordance with a second preferred embodiment of the invention.

In the following, the above described coding of a scene transition by means of an INTRA frame transition is illustrated with reference to FIG. 4. FIG. 4 shows all image frames 100, 102 and 104 of a first (ending) scene, placed on a base layer, their depth position defining them as background pictures and their opacity value being at maximum (100%). At least image frames 106 and 108, occurring during the scene transition, of a second (beginning) scene, are placed on a first enhancement layer. These image frames are P frames that are temporally predicted backwards from I frame 110. Depending on the coding method used, I frame 110 may be located either on the base layer or on the first enhancement layer.

As regards the coding of a scene transition, it is essential that the depth position placement of image frames located on an enhancement layer and occurring during a scene transition define them as foreground pictures, and their opacity values change gradually. If the intention is to accomplish a cross-faded scene transition similar to that in the example of FIGS. 1 and 2 above, the opacity value of image frame 106 is set to 33% and the opacity value of image frame 108 to 67%.

The above examples clearly show how the method of the invention combines an improved, i.e. more compression-efficient, cross-faded scene transition using weighted averages with video coding that is scalable by layers. Scalability by layers can be preferably utilized in the implementation of a cross-faded scene transition and, on the other hand, if the enhancement layer has to be discarded from the video sequence, for instance because of a narrowing available bandwidth, the scene transition can still be preferably performed as an abrupt scene transition.

The above examples present a simplified illustration of the invention using only two scalability layers: the base layer and one enhancement layer. However, in scalable coding, the number of enhancement layers is typically not restricted at all, but the coding is able to use several enhancement layers in addition to the base layer. Furthermore, in some coding methods, the base layer is further dividable such that a separate INTRA layer exists above it comprising only I frames and being followed by the actual base layer and below it a necessary number of enhancement layers.

Furthermore, the above examples illustrate the invention in situations where a scene transition is performed between two scenes. However, the invention is not restricted to scene transitions between only two scenes, but the coding can be performed by coding more than two scenes in the same scene transition. The different scenes may be temporally consecutive or at least partly overlapping. In this case, the different scenes can be placed on different scalability layers such that after the scene transition, the image frames comprised by a continuous scene are preferably placed on the base layer and the image frames comprised by the other scenes are placeable in several different manners on several enhancement layers. The image frames to be generated during a scene transition can be coded in the above manner by defining a different depth position for the image frames of the different scenes and by weighting the opacity values of the different image frames in different manners.

In this case, one way to proceed is to place the first scene on the base layer, to place monochrome, e.g. black frames on the first enhancement layer at least for part of the duration of the scene transition, and to place the second scene on the second enhancement layer. For example in FIG. 4, the monochrome frames may be thought to exist between frames 102 and 106, and similarly between frames 104 and 108. This enables the scene transition between the first and the second scene to be performed by first fading the first scene in black, whereupon the information may be returned in the image frames to the second scene for instance as a cross-faded scene transition described above. Such a scene transition between different scenes through black or white is very typical for example in documentary videos.

A problem in scanning video files arises when scanning is to be started in the middle of a video sequence. Such situations arise for instance when a user wants to scan a locally stored video file forward or backward, or a streaming file at a given point, when a user starts playing back a streaming file at a random point, or when an error stopping the playback of a video file is observed in a video file to be played back requiring that the playback of the file be restarted from some point subsequent to the error. To continue scanning a video file at a random point requires that an independently decodable group of pictures GOP be found. Scene transitions are often coded by predicting the latter group of pictures from a first group of pictures belonging to the scene transition, and thus the latter group of pictures is not independently decodable and cannot be used to continue scanning the video file. However, a beginning scene would be a natural point to start scanning the file.

In accordance with a preferred embodiment of the invention, this is avoidable in a decoder in such a manner that when the scanning of a video file starts at a random point, the decoder looks for said point in the video sequence of the following scene transition and starts decoding from the scene transition. This can preferably be implemented, since in the scene transition of the invention, the second (beginning) scene starts as an I frame, which thus acts as the starting point of an independently decodable group of pictures GOP or a sub-sequence. As regards the above described transfer of an INTRA frame, it is also feasible that the I frame acts as a starting point for the decoding. In this way the scene transition of the invention preferably provides a point from which decoding can be started after a random scanning point.

In accordance with a preferred embodiment of the invention, B frames can also be used in a scene transition for displaying image frames that occur during the scene transition. In this case, the image information of the B frames that occur during the scene transition is determined from these anchor frames by temporal prediction by calculating the pixel values of the macro blocks in the predicted image frames as average values or weighted average values of the pixel values of the motion-compensated prediction blocks of the anchor frames relative to the distance of each B frame from both anchor frames. Because the compression efficiency of B frames is typically better than that of P frames, a better quality is achieved also for the image frames combined in the scene transition at a corresponding bit rate than if the image frames corresponding to the B frames were P frames. If an image frame occurring during a scene transition, such as a conventional B frame, is not used to predict other frames, and does not have to be transmitted, temporally corresponding image frames on other enhancement layers should neither be transmitted.

In order to achieve sufficient compression efficiency, the bit rate of the part to be discarded from the bit stream of the video sequence can be determined such that it depends on the lengths of the scenes, i.e. the time between scene transitions, and on the duration of the scene transition. If the assumption here is that a constant bit rate is used and an equal bit rate is reserved for the use of each image frame, a formula can be defined for approximating the portion of discardable data in a cross-faded scene transition from the data reserved for the use of the image frames. If the portion of discardable data is denoted by S(discard), the average duration of the cross-faded scene transition is denoted by D(cross-fade), and the length of the scenes is denoted by T(scene cut), the portion of discardable data can be given by formula 1:

$$S(\text{discard}) = D(\text{cross-fade}) / (2 \times D(\text{cross-fade}) + T(\text{scene cut})) \quad (1.)$$

Figure 5:
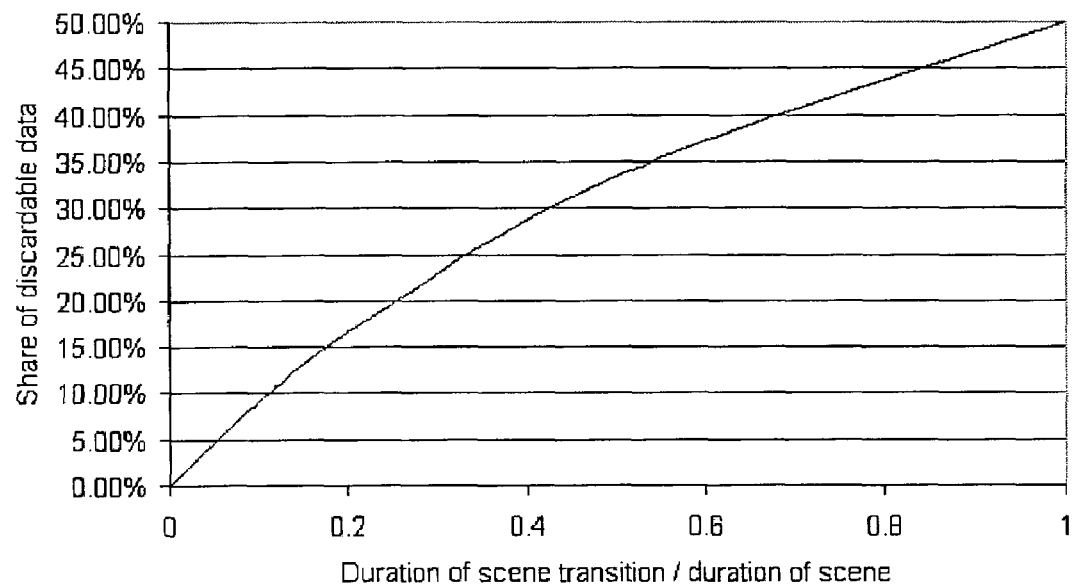
FIG. 5 shows a graph illustrating the portion of discardable data as a function of the duration of the cross-faded scene transition in accordance with a preferred embodiment of the invention.

The portion of discardable data as a function of the duration of the cross-faded scene transition can be presented by the curve of the graph of FIG. 5. The graph shows that if a cross-faded scene transition is not used (duration of scene transition is zero, i.e. an abrupt scene transition is involved), the amount of data to be discarded during the scene transition is naturally zero. On the other hand, if the duration of the scene transition is equal to that of the actual scene, half of the image frame data can be discarded during the scene transition. The ratio of the duration of the scene transition to the duration of the entire scene is typically below 0.1, the amount of discardable data being less than 10%. For instance a movie trailer may include scenes of the duration of one second, between which a 0.1-second cross-fading is used, the ratio of the duration of the scene transition to the duration of the entire scene being exactly 0.1, which corresponds to a portion of 9% of discardable data. Similarly, a news clip may include for instance 5-second scenes, which are cross-faded to the next scene during 0.3 seconds. In this case the ratio of the duration of the scene transition to the length of the entire scene is 0.06, corresponding to a portion of about 6% of discardable data.

The graph of FIG. 5 further shows that at its maximum, the amount of discardable data is calculated using weighted averages, which thus resembles the above prediction of B pictures by weighting the distances between the image frames used as anchor frames.

In accordance with a preferred embodiment of the invention, data can be discarded from a video sequence during a scene transition according to the above formula as transition filtering, known per se, such as SMIL filtering (Synchronized Multimedia Integration Language). The SMIL 2.0 standard presents means for transition filtering of for instance image and video files. The filtering process uses one source or filtering is determined to take place between two sources based on which the filtering output is determined to a given range in the image frame. The filter determines the transition between the origin media and the destination media by denoting the origin media by the value 0.0 and the destination media by the value 1.0. This enables the filtering process and the desired result to be determined by setting a suitable value on said parameter.

The SMIL 2.0 standard presents a plurality of different filtering effects that are applicable to the transition filtering according to the invention. In accordance with a preferred embodiment of the invention, the properties of the filters, particularly said parameter determining the transition are determined in accordance with formula 1. In addition, the desired filtering effect affects the type of filter used. A detailed description of the SMIL 2.0 standard is found in specification 'The SMIL 2.0 Transition Effects Module', W3C, 7.8.2001.

Consequently, coding a scene transition according to the invention is not only limited to the above examples and a cross-faded or abrupt scene transition, but, in principle, the invention is applicable to any type of scene transition. Accordingly, the invention is applicable for instance to the previously mentioned tiling, roll, push, door or different zoomings. In principle, the procedure is the same in all scene transitions: determining the opacity and depth values for each frame during the scene transition and the filter type required for the scene transition and the effect used.

The above describes a method of coding a scene transition as a scalable video sequence. In concrete terms, this is performed in a video encoder, which may be a video encoder known per se. The video encoder used could be for instance a video encoder according to the ITU-T recommendations H.263 or H.26L, which, in accordance with the invention, is arranged to determine that the presentation time of at least one video frame of the first scene is equal to the presentation time of at least one video frame of the second scene during the scene transition, said video frames thus being scene transition video frames, to define scene transition information for at least one video frame of at least one scene for generating a scene transition with a decoder, to code said at least one scene transition video frame of the first scene in a encoder into a video sequence, to code at least said one scene transition video frame of the second scene in the encoder into the video sequence, and to code said scene transition information in the encoder into the video sequence.

Correspondingly, decoding takes place in a video encoder, which may be a video decoder known per se. The video decoder used could be for instance a low bit rate video decoder according to the ITU-T recommendations H.263 or H.26L, which, in accordance with the invention, is arranged to receive a video frame, coded in a decoder, of a first scene, a coded video frame of a second scene and coded scene transition information, to decode the coded video frame of the first scene, the coded video frame of the second scene and the coded scene transition information, and to generate a scene transition by using the decoded video frame of the first scene, the decoded video frame of the second scene and the decoded scene transition information.

The different parts of video-based telecommunication systems, particularly terminals, may comprise properties to enable bi-directional transfer of multimedia files, i.e. transfer and reception of files. This allows the encoder and decoder to be implemented as a video codec comprising the functionalities of both a encoder and a decoder.

It is to be noted that the functional elements of the invention in the above video encoder, video decoder and terminal can be implemented preferably as software, hardware or a combination of the two. The coding and decoding methods of the invention are particularly well suited to be implemented as computer software comprising computer-readable commands for carrying out the functional steps of the invention. The encoder and decoder can preferably be implemented as a software code stored on storage means and executable by a computer-like device, such as a personal computer (PC) or a mobile station, for achieving the coding/decoding functionalities with said device.

Figure 6:
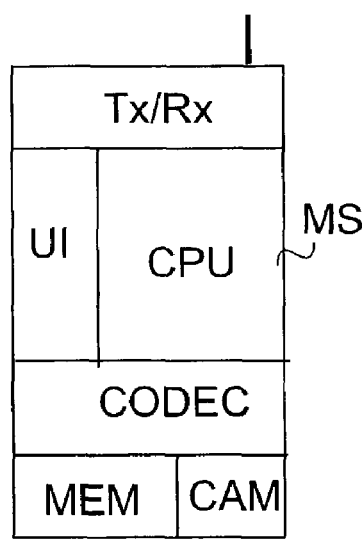
FIG. 6 shows a block chart illustrating a mobile station in accordance with a preferred embodiment of the invention.

FIG. 6 shows a block diagram of a mobile station MS according to a preferred embodiment of the invention. In the mobile station MS, a central processing unit CPU controls blocks responsible for the various functions of the MS: a memory MEM comprising typically both random access memory RAM and read-only memory ROM, a radio frequency part comprising transmitter/receiver TX/RX, a video codec CODEC and a user interface UI. The user interface comprises a keyboard KB, a display DP, a speaker SP and a microphone MF. The CPU is a microprocessor, or in alternative embodiments, some other kind of processor, such as a digital signal processor. Advantageously, the operating instructions of the CPU have been stored in forehand in the ROM. In accordance with its instructions (i.e. a computer program), the CPU uses the radio frequency block for transmitting and receiving data over a radio path. The video codec may be either hardware based or fully or partly software based, in which case the CODEC comprises computer programs for controlling the CPU to perform video encoding and decoding functions as explained above. The CPU uses the RAM as its working memory. Furthermore, the mobile station MS can advantageously include a video camera CAM, whereby the mobile station can capture motion video by the video camera. The captured motion video is then encoded and compressed using the CPU, the RAM and CODEC based software. The radio frequency block is then used to exchange encoded video with other parties.

The invention can also be implemented as a video signal comprising at least a first and a second scene, the first scene being an ending scene and the second a beginning scene, at least one of the scenes comprising independently decodable video frames coded in accordance with at least a first frame format, and video frames coded in accordance with a second frame format, at least one of the video frames according to the second frame format being predicted from at least one other video frame. Such a video signal comprises scene transition information for at least one video frame of at least one scene for generating a scene transition with a decoder.

It is obvious to a person skilled in the art that as technology advances, the basic idea of the invention can be implemented in a variety of ways. The invention and its embodiments are thus not limited to the above examples, but may vary within the claims.

The invention claimed is:

1. A method of generating a scene transition in a video sequence between at least a first and a second scene, the first scene being an ending scene and the second scene a beginning scene, at least one of said scenes comprising independently decodable video frames coded in accordance with at least a first frame format, and video frames coded in accordance with a second frame format, at least one of the video frames according to the second frame format being predicted from at least one other video frame, the method comprising
   determining that the duration of the presentation time of at least one whole video frame of the first scene is equal to the duration of the presentation time of at least one whole video frame of the second scene during the scene transition, said video frames being scene transition video frames,
   determining scene transition information for at least one video frame of at least one scene for generating a scene transition with a decoder,
   coding at least said one scene transition video frame of the first scene
   and at least said one scene transition video frame of the second scene in the encoder into the video sequence such that at least the scene transition video frames of at least the first and second scenes are placed onto different scalability layers in the video sequence, and
   coding said scene transition information in the encoder into the video sequence.

2. A method as claimed in claim 1, wherein
said different scalability layers comprise at least a base layer and a first enhancement layer.

3. A method as claimed in claim 1, further comprising
coding the scene transition into the video sequence such that the video sequence comprises a scene transition video frame of at least said one first scene and a scene transition video frame of at least said one second scene, whose image frame information is mixed according to a ratio predetermined by said scene transition information.

4. A method as claimed in claim 3, further comprising
mixing said scene transition video frames by filtering the image frame information comprised thereby.

5. A method as claimed in claim 4, further comprising performing said filtering as transition filtering.

6. A method as claimed in claim 1, wherein the scene transition to be coded into the video sequence is at least one of the following:
a cross-faded scene transition, tiling, rolling, pushing, zooming.

7. A video encoder for generating a scene transition in a video sequence between at least a first and a second scene, the first scene being an ending scene and the second scene a beginning scene, at least one of said scenes comprising independently decodable video frames coded in accordance with at least a first frame format, and video frames coded in accordance with a second frame format, at least one of the video frames according to the second frame format being predicted from at least one other video frame, wherein the video encoder is arranged to
determine that the duration of the presentation time of at least one whole video frame of the first scene is equal to the duration of the presentation time of at least one whole video frame of the second scene during the scene transition, said video frames being scene transition video frames,
determine scene transition information for at least one video frame of at least one scene for generating a scene transition with a decoder, to code said at least one scene transition video frame of the first scene in a encoder into a video sequence,
code at least said one scene transition video frame of the first scene
and at least said one scene transition video frame of the second scene in the encoder into the video sequence such that at least the scene transition video frames of at least the first and second scenes are placed onto different scalability layers in the video sequence, and
code said scene transition information in the encoder into the video sequence.

8. A video encoder as claimed in claim 7, wherein said different scalability layers comprise at least a base layer and a first enhancement layer.

9. A mobile station of a mobile communication system, including a video encoder for generating a scene transition in a video sequence between at least a first and a second scene, the first scene being an ending scene and the second scene a beginning scene, at least one of said scenes comprising independently decodable video frames coded in accordance with at least a first frame format, and video frames coded in accordance with a second frame format, at least one of the video frames according to the second frame format being predicted from at least one other video frame, wherein the video encoder is arranged to
determine that the duration of the presentation time of at least one whole video frame of the first scene is equal to the duration of the presentation time of at least one whole video frame of the second scene during the scene transition, said video frames being scene transition video frames,
determine scene transition information for at least one video frame of at least one scene for generating a scene transition with a decoder, to code said at least one scene transition video frame of the first scene in a encoder into a video sequence,
code at least said one scene transition video frame of the first scene
and at least said one scene transition video frame of the second scene in the encoder into the video sequence such that at least the scene transition video frames of at least the first and second scenes are placed onto different scalability layers in the video sequence, and
code said scene transition information in the encoder into the video sequence.

10. A computer readable storage medium encoded with a computer program including computer-executable instructions for generating a scene transition in a video sequence between at least a first and a second scene, the first scene being an ending scene and the second scene a beginning scene, at least one of said scenes comprising independently decodable video frames coded in accordance with at least a first frame format, and video frames coded in accordance with a second frame format, at least one of the video frames according to the second frame format being predicted from at least one other video frame, the computer-executable instructions performing steps comprising:
determining that the duration of the presentation time of at least one whole video frame of the first scene is equal to the duration of the presentation time of at least one whole video frame of the second scene during the scene transition, said video frames being scene transition video frames,
determining scene transition information for at least one video frame of at least one scene for generating a scene transition with a decoder, to code said at least one scene transition video frame of the first scene in a encoder into a video sequence,
coding at least said one scene transition video frame of the first scene
and at least said one scene transition video frame of the second scene in the encoder into the video sequence such that at least the scene transition video frames of at least the first and second scenes are placed onto different scalability layers in the video sequence, and
coding said scene transition information in the encoder into the video sequence.

* * * * *

UNITED STATES PATENT AND TRADEMARK OFFICE
CERTIFICATE OF CORRECTION

PATENT NO. : 7,436,886 B2
APPLICATION NO. : 10/348686
DATED : October 14, 2008
INVENTOR(S) : Hannuksela It is certified that error appears in the above-identified patent and that said Letters Patent is hereby corrected as shown below:

<u>On the Title Page:</u>

References Cited (56), Foreign Patent Documents: "EP 1 123 812" should read --EP 1 132 812--.

Signed and Sealed this

Seventeenth Day of November, 2009

David J. Kappos
*Director of the United States Patent and Trademark Office*